April 8, 1941.   F. H. GULLIKSEN   2,237,665
CONTROL APPARATUS
Filed Sept. 30, 1938
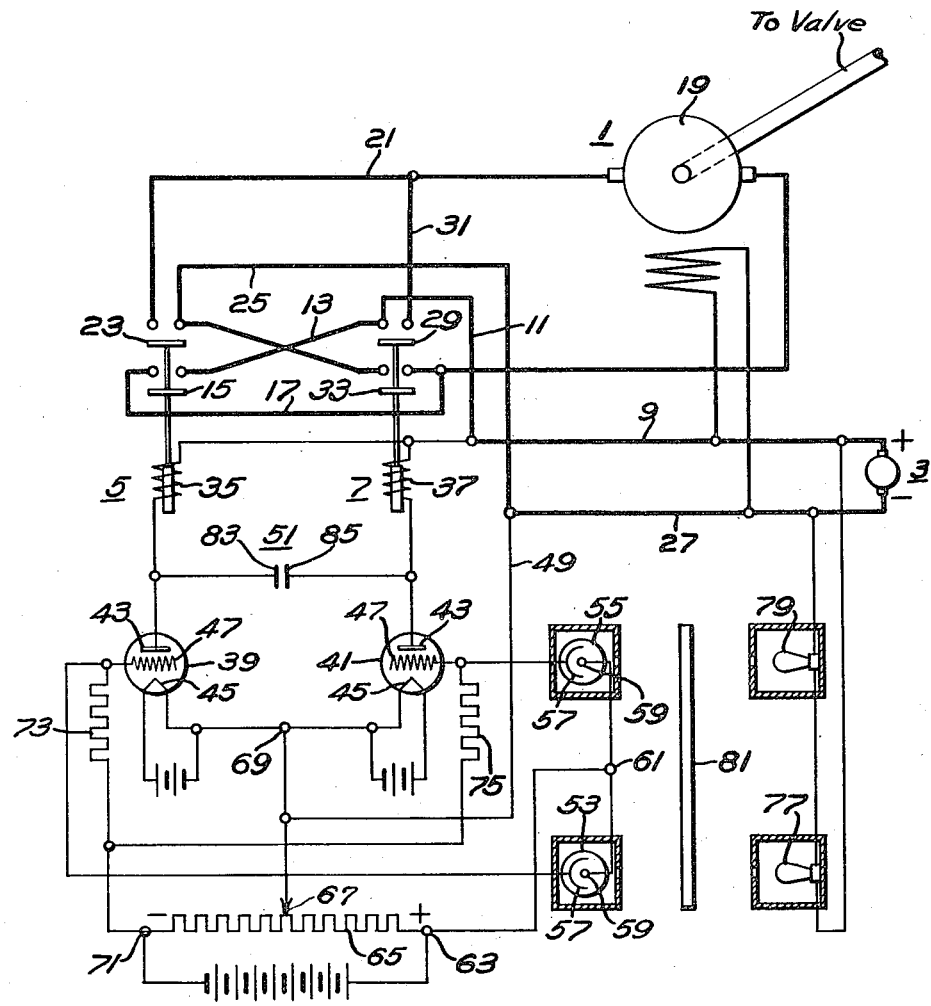
WITNESSES:
INVENTOR
Finn H. Gulliksen.
BY
ATTORNEY Patented Apr. 8, 1941

2,237,665

UNITED STATES PATENT OFFICE 2,237,665

CONTROL APPARATUS

Finn H. Gulliksen, Pittsburgh, Pa., assignor to Westinghouse Electric & Manufacturing Company, East Pittsburgh, Pa., a corporation of Pennsylvania Application September 30, 1938, Serial No. 232,651

1 Claim. (Cl. 250—41.5)

My invention relates to control apparatus and has particular relation to apparatus for producing extended operation of translating means in response to energy impulses of short duration.

It is often necessary to provide control apparatus which causes a system to operate successively in one sense and the opposite sense for extended intervals of time in response to successive impulses persisting for short intervals of time. Extensive use for such control apparatus is found for example in sewage disposal plants in which it is important that the level of the sludge be maintained between two well defined limits. When the sludge level rises above the upper limit, a valve is opened and a pump is set into operation to lower the level and when the sludge level falls below the lower limit, the converse operation takes place. Control apparatus of the same type may also with advantage be used in vehicle actuable traffic regulating systems. In such a case an impulse produced by a vehicle moving in one of a pair of intersecting highways causes a right of way signal to be displaced for the highway and a stop signal for the other intersecting highway, and a vehicle subsequently moving in the latter highway and producing a corresponding impulse causes the right of way to be transferred from the former highway to the latter highway, and the stop signal to be transferred from the latter highway to the former highway. Control apparatus for producing the desired operation constructed and operated in accordance with the prior art of which I am aware is relatively complex and, therefore, is expensive and requires considerable servicing.

It is, accordingly, an object of my invention to provide control apparatus of simple and tractable structure for use with a translating system which shall produce successive operation of the translating system in one sense and the opposite sense in response to successive short energy impulses.

Another object of my invention is to provide control apparatus for a translating system which, in response to an impulse shall produce operation of the system in one sense and in response to another impulse shall produce operation of the system in the second sense, the operation in the first sense continuing until after the operation in the second sense has been initiated.

More concisely stated, it is an object of my invention to provide simple and inexpensive apparatus particularly adapted for use in maintaining a level of a liquid between two well defined limits, as for example, in a sewage disposal plant, for controlling traffic in response to vehicle actuation and for other similar applications.

According to my invention the actuating impulses are impressed on one or the other of a pair of discharge valves of the arc like type supplied from a direct current source. The valve on which an impulse is impressed is rendered conductive and remains conductive until an impulse is impressed on the other valve rendering it conductive. The two valves are so interconnected that when the non-conductive valve is rendered conductive, it extinguishes the originally conductive valve.

The novel features that I consider characteristic of my invention are set forth with particularity in the appended claim. The invention itself, however, both as to its organization and its method of operation, together with additional objects and advantages thereof will best be understood from the following description of a specific embodiment when read in connection with the accompanying drawing, in which the single figure is a diagrammatic view showing an embodiment of my invention.

In the drawing, my invention is shown as applied to the regulation of the level of a liquid. In such a case the liquid level is controlled by a valve (not shown), the opening of which is varied by a reversible direct current motor 1. The motor is supplied from a direct current source 3 through the contacts of one or the other of a pair of relays 5 and 7. For one direction of rotation of the motor 1, current is supplied in a circuit extending from the positive line conductor 9 of the source 3 through a conductor 11, a conductor 13, the lower movable contactor 15 of one of the relays 5, a conductor 17, the armature 19 of the motor 1, a conductor 21, the upper movable contactor 23 of the same relay, a conductor 25 to the negative line conductor 27. Current of the opposite polarity is supplied to the motor 1 in a circuit extending from the positive line conductor 9 through the conductor 11, the upper movable contactor 29 of the other relay 7, a conductor 31, the conductor 21, the armature 19 of the motor, the conductor 17, the lower movable contactor 33 of the relay, the conductor 25 to the negative line conductor 27.

The exciting coils 35 and 37 of the relays 5 and 7, respectively, are in the anode circuits of electric discharge devices 39 and 41, respectively. Each of the discharge devices is of the arc-like type and comprises an anode 43, a hot cathode 45 and a control electrode 47 and an ionizing medium such as is produced by a noble gas or by mercury vapor. The discharge devices are supplied from the direct current source 3. The circuit for the left-hand relay coil 35 extends from the positive line conductor 9 of the source through the exciting coil 35, the anode 43 and the cathode 45 of the left-hand discharge device 39, a conductor 49 to the negative line conductor 27. The circuit for the other coil 37 is similar. The anodes 43 of the discharge devices 39 and 41 are interconnected by a capacitor 51 which functions to render a conductive discharge device non-conductive when the other discharge device is rendered conductive.

The discharge devices 39 and 41 are controlled from photo-sensitive devices 53 and 55, respectively. The cathode 57 of each of the photo-sensitive devices 53 and 55 is connected directly to the control electrode 47 of the corresponding discharge device. The anodes 59 of the photo-sensitive devices are connected together and their common junction point 61 is connected to the positive terminal 63 of a voltage divider 65, the adjustable tap 67 of which is connected to the common junction point 69 of the cathodes 45 of the discharge devices 39 and 41. The negative terminal 71 of the voltage devider 65 is connected through suitable grid resistors 73 and 75, respectively, to the control electrodes 47 of the discharge devices 39 and 41 and, therefore, a negative bias potential, when the photo-sensitive devices 53 and 55 are unexcited, is impressed in the control circuits of the discharge devices through the voltage divider 65.

The conductivity of the photo-sensitive devices 53 and 55 is controlled by radiant energy sources 77 and 79, respectively. The sources may be of any suitable type and may project visible or invisible radiations in accordance with the requirements of the apparatus. The radiant energy beams from the sources 77 and 79 are intercepted by an opaque object 81 which, in the present case, is a float which rises and falls in accordance with the level of the liquid to be regulated.

For the purpose of explaining the operation, let us assume that when the circuit is first closed the float 81 blocks the radiant energy impinging on both photo-sensitive devices 53 and 55. In such a case the corresponding discharge devices 39 and 41 are initially non-conductive. Let us now assume that the level of the liquid is rising so that the float 81 is moved upward. In such a case the float eventually rises above the lower radiant energy beam, permitting the lower photo-sensitive device 53 to be rendered conductive. The bias impressed in the control circuit of the left-hand electric discharge device 39 to which the lower photo-sensitive device 53 is connected is counteracted by the current flow through the photo-sensitive device 53 and the left-hand discharge device 39 is rendered conductive. The associated relay 5 is then energized and causes the motor 1 to rotate the valve in a direction such as to lower the level of the liquid. The float 81 now drops so that it blocks the radiant energy impinging on the lower photo-sensitive device. However, this has no effect on the left-hand discharge device 39 and its associated relay 5 since the anode-cathode circuit of the former is supplied from a direct current source and the discharge is maintained in spite of the variation in control potential. The current flow through the left-hand discharge device 39, however, causes the capacitor 51 to charge with its left-hand plate 83 negative and its right-hand plate 85 positive.

The float 81 continues to fall with the liquid until it has dropped to a level permitting radiant energy to impinge on the upper photo-sensitive device 55. In such a case the associated right-hand discharge device 41 is rendered conductive and the right-hand relay 7 becomes energized. At the same time the positive plate 85 of the capacitor 51 is connected through the right-hand discharge device 41, which has a relatively small arc drop, to the cathode 45 of the left-hand discharge device 39. Since the anode 43 of the left-hand discharge device 39 is connected to the negative plate 83 of the capacitor 51, the negative potential of the capacitor is now impressed across the left-hand device 39 and the latter is rendered non-conductive. The left-hand relay 5, therefore, drops out and the motor 1 now rotates in a direction such as to close the valve, and to permit the liquid level to rise. Again the fact that the radiant energy from the upper source to the upper photo-sensitive device 55 is interrupted is of no consequence since the right-hand discharge device is supplied from a direct current source. On the other hand, the capacitor 51 is now charged with its right-hand plate 85 negative and its left-hand plate 83 positive. The level of the liquid now rises until the lower photo-sensitive device 53 is rendered conductive and the converse of the above described process is repeated.

Although I have shown and described certain specific embodiments of my invention, I am fully aware that many modifications thereof are possible. My invention, therefore, is not to be restricted except insofar as is necessitated by the prior art and by the spirit of the appended claim.

I claim as my invention:

In combination with a source of uni-directional current and a load to be supplied thereby, a pair of grid-controlled electrical discharge devices each having an anode, a cathode and a control electrode, a common connection to the cathodes of said two discharge devices joining them to the negative terminal of said source, a separate connection embodying one of said operating coils from the anode of each said discharge device to the positive terminal of said source, a capacitor having its terminals respectively connected to the respective anodes of said discharge devices, one of said circuit interrupting means being adapted to connect said load to said source with one polarity when its associated operating coil is energized and the other said circuit interrupting means being adapted to connect said load to said source with the opposite polarity when its associated operating coil is energized, photo-sensitive means connected to one of said discharge devices to render the latter conductive when it is illuminated, a second photo-sensitive means connected to the control electrode of the other of said discharge devices to render the latter condutcive when said second photo-sensitive means is illuminated, and float actuated means for so controlling the illumination incident upon said two photo-sensitive devices that they are never simultaneously illuminated.

FINN H. GULLIKSEN.